United States Patent Office 3,488,412
Patented Jan. 6, 1970

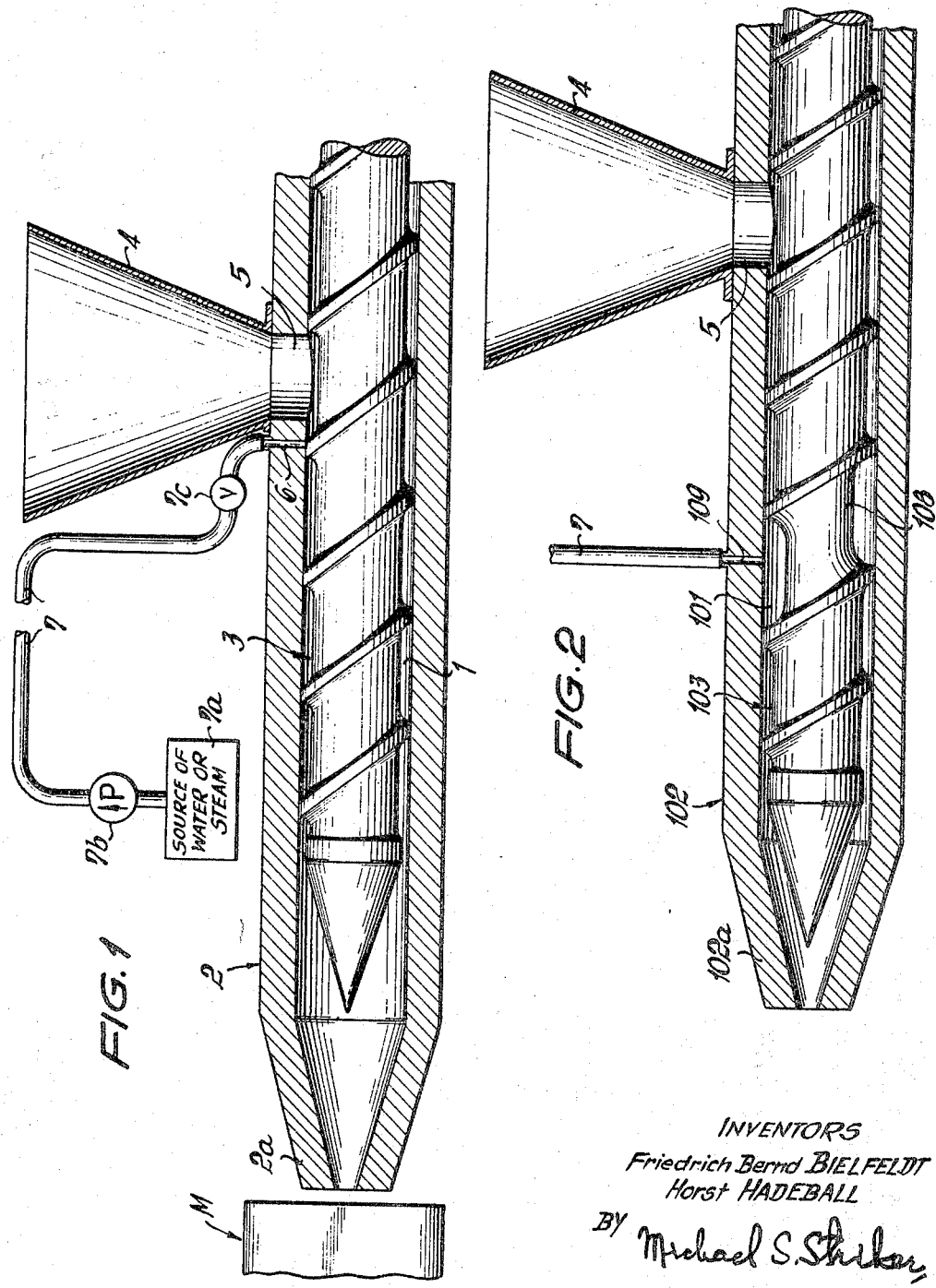

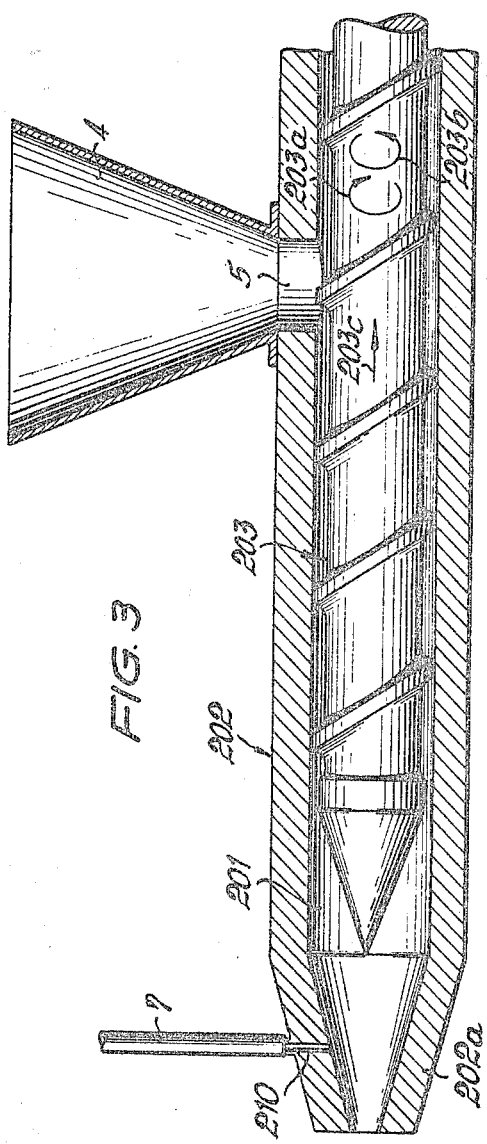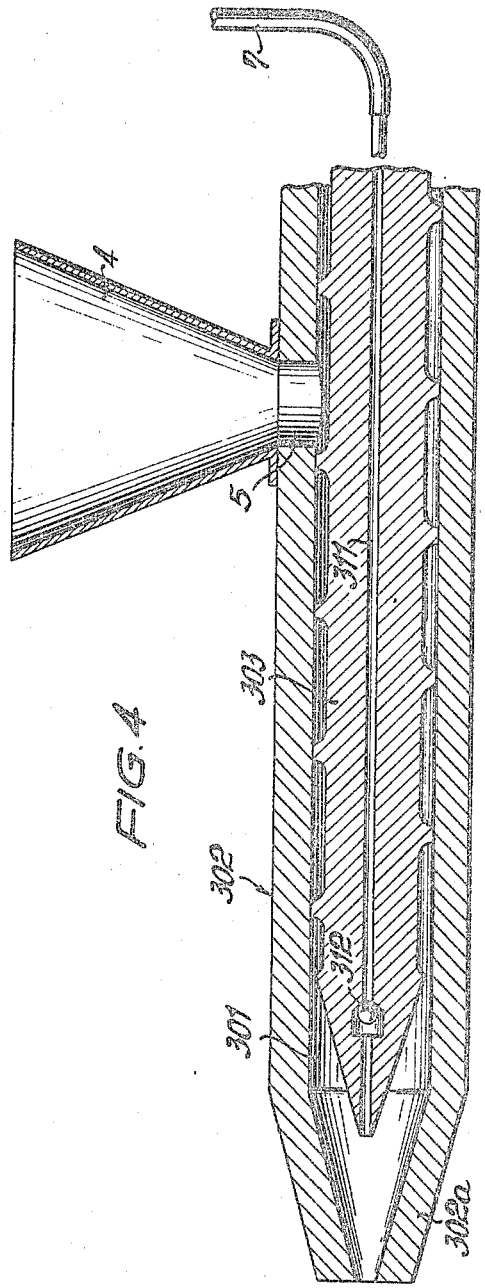
INVENTORS
Friedrich Bernd BIELFELDT
Horst HADEBALL
BY Michael S. Striker
their ATTORNEY

3,488,412
METHOD OF PURGING THERMOSETTING MATERIALS FROM AN INJECTION MOLDING MACHINE
Friedrich Bernd Bielfeldt, Pappenheim, and Horst Hadeball, Weissenburg, Bavaria, Germany, assignors to Eckert & Ziegler GmbH, Weissenburg, Bavaria, Germany
Filed Apr. 20, 1967, Ser. No. 632,284
Claims priority, application Germany, Apr. 22, 1966,
E 31,498
Int. Cl. B29f 1/03
U.S. Cl. 264—39
11 Claims

ABSTRACT OF THE DISCLOSURE

Hardening of thermosetting synthetic plastic material in the cylinder of an injection molding machine during prolonged stoppage of such machine is prevented by admission of 2-4 percent by volume of water prior to stoppage. Water may be admitted in liquid or vaporized state, and the point of admission may be adjacent to the nozzle or to the feed chute. Alternatively, water may be admitted through an axial bore of the plunger or such plunger may be provided with an annular expansion chamber which registers with the point of water admission.

BACKGROUND OF THE INVENTION

The present invention relates to machines for processing of thermosetting synthetic plastic material, and more particularly to improvements in injection molding machines for thermosetting material. The invention also relates to a method of operating injection molding machines for thermosetting material.

Injection of thermosetting materials, also called jet process, is carried out by resorting to machines wherein a plunger reciprocates in the chamber of a heating cylinder to perform alternating working and return strokes and to inject plastic molding material into the cavity or cavities of a mold. Serious problems arise when the machine is stopped for shorter or longer periods of time because the material tends to harden in the cylinder chamber. Such problems are particularly acute if the machine is arrested for relatively long periods of time.

It is an important object of our invention to provide a method of effectively preventing hardening of thermosetting material in the heating cylinder when the injection molding machine is at a standstill.

Another object of the invention is to provide a method of the just outlined character according to which the material is prevented from hardening in such a way that very small quantities of material are wasted on resumption of operation of the injection molding machine.

A further object of the invention is to provide a simple, economical and reliable method of preventing hardening of thermosetting material when the plunger of the injection molding machine is idle.

An additional object of the invention is to provide an injection molding machine with a simple, inexpensive and compact accessory which prevents hardening of thermosetting material in the heating cylinder in response to short-lasting or extended inactivation of the plunger.

Still another object of the invention is to provide an accessory which can be combined with or incorporated in presently known injection molding machines for thermosetting synthetic plastic material.

SUMMARY OF THE INVENTION

One feature of our invention resides in the provision of a method of operating an injection molding machine, and more particularly of preventing hardening of thermosetting synthetic plastic material in an injection molding machine of the type wherein the material is expelled through a nozzle provided at one end of a cylinder whose chamber accommodates a reciprocable plunger and receives thermosetting material from a feed chute which is remote from the nozzle. The method comprises admitting into the cylinder chamber predetermined amounts of water in liquid or vaporized state prior to stoppage of the machine. Water may be admitted in the region of the nozzle, in the region of the feed chute, through one or more axial bores of the plunger, and/or through the cylinder intermediate the nozzle and the feed chute. In the latter instance, the plunger is preferably provided with an annular expansion chamber which registers with the point of water admission at the time when the supply system is about to admit water into the cylinder chamber. Furthermore, and if water is admitted in the region of the nozzle (either through the cylinder or through the plunger), the plunger is preferably withdrawn in a direction away from the nozzle to relieve the pressure in the cylinder chamber. The volumetric ratio of water to thermosetting material in the cylinder chamber need not be higher than one-to-twenty. For example, the amount of admitted water may constitute between 2 and 4 percent of the quantity of thermosetting material in the cylinder. Water may be admitted at one or more points and, if admitted at several points, such points may but need not be closely adjacent to each other. For example, the supply system may admit water through the plunger and through one or more radial bores of the cylinder.

The novel features which are considered as characteristic of the invention are set forth in particular in the appended claims. The improved injection molding machine itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a somewhat schematic axial sectional view of an injection molding machine which embodies one form of our invention and wherein the admission of water takes place in immediate proximity of the feed chute;

FIG. 2 is a similar axial sectional view of a second machine wherein the point of water admission is in registry with an expansion chamber of the plunger;

FIG. 3 is an axial sectional view of a third machine wherein the point of water admission is adjacent to the nozzle; and FIG. 4 is an axial sectional view of a fourth machine wherein the admission of water takes place through an axial bore of the plunger.

DESCRIPTION OF THE PREFERRED EMBODIMENT

Referring first to FIG. 1, there is shown an injection molding machine, also called jet molding machine, which is utilized in the production of articles consisting of thermosetting synthetic plastic material. The machine comprises a heating cylinder 2 having an internal chamber 1 which can receive a charge of plastic material from the outlet 5 of a feed chute or hopper 4 and is provided with a nozzle 2a adapted to inject plasticized material into a mold M. The chamber 1 receives a rotary and reciprocable plunger in the form of a feed screw 3. The exact manner in which the plunger 3 cooperates with the cylinder 2 to plasticize the charge admitted via outlet 5 and to expel such material through the orifice of the nozzle 2a forms no part of our invention.

One feature of our invention resides in the provision of a supply system which can admit into the cylinder chamber 1 predetermined amounts of water in liquid or vaporized state whereby such water prevents hardening of plastic material which remains in the chamber 1 when the plunger 3 has completed the last working stroke in a direction toward the nozzle 2a. The supply system comprises a source 7a of water in liquid or vaporized state, a pump 7b or an analogous device which can force water from the source 7a into a supply conduit 7 whose outlet is connected to an opening 6 provided in the cylinder 2 immediately adjacent to the outlet 5 of the feed chute 4 (i.e., closer to the feed chute than to the nozzle 2a), and a suitable valve 7c serving to regulate the amounts of water which are admitted into the chamber 1. The valve 7c may be of conventional design and may include a timer which arrests the pump 7b after a preset period of water admission into the cylinder 2. The details of the valve 7c form no part of our present invention.

Our invention is based in part on the recognition that hardening of thermosetting material can be delayed by admission of moisture and that the delay is greater if the percentage of moisture is increased. We assume that such delay is due to the fact that the specific heat of a moist thermosetting plastic mass is higher than the specific heat of a dry mass. Delayed hardening of a moist thermosetting mass is also attributable to greatly increased amounts of evaporation heat whereby the temperature of particles of thermosetting mass does not rise above boiling temperature of water until after complete evaporation of water which has been admitted by the supply system.

The admission of water via supply conduit 7 will take place shortly prior to stoppage of the machine, and the amounts of admitted water are preferably in the range of 2–4 percent by volume of thermosetting material in the cylinder chamber 1. As a rule, the ratio of water to thermosetting material is less than one-to-twenty. Experiments with our injection molding machine have proven that, quite surprisigly, hardening of thermosetting material is invariably delayed in response to admission of controlled amounts of water, and that such hardening can be delayed for extended periods of time. This enables the operators to arrest the machine for shorter or longer periods of time, for example, to inspect or replace the mold M, to replenish the charge in the feed chute 4, or for any other foreseen or unforeseen reason. Admission of water is preferably carried out in such a way that water does not affect the contents of the feed chute 4. This insures that only small quantities of thermosetting material will be wasted on resumption of the operation of the injection molding machine. In other words, it might become necessary to discard products which are formed of material having an excessive moisture content due to admission of water into the cylinder chamber 1, but the quantity of such material is relatively small because water does not penetrate into the hopper 4.

FIG. 2 illustrates a portion of a second injection molding machine. The mold M has been omitted and only the supply conduit 7 of the supply system has been shown. This conduit 7 discharges water in liquid or vaporized state into an opening 109 provided in the heating cylinder 102 substantially midway between the nozzle 102a and the outlet 105 of the feed chute 104. The plunger 103 is constituted by a feed screw and is provided with an annular expansion pone or chamber 108 which is in registry with the opening 109 when the conduit 7 admits water into the cylinder chamber 101.

Referring now to FIG. 3, there is shown an injection molding machine wherein the supply conduit 7 admits water in liquid or vaporized state into an opening 210 provided in the heating cylinder 202 adjacent to the nozzle 202a or directly in this nozzle. The plunger 203 rotates in the direction of arrow 202a when it performs a working stroke to feed the charge toward the orifice of the nozzle 202a. The effect of water admitted by the conducit 7 can be improved by causing the plunger 203 to perform a short rearward stroke (arrow 203c) during admission of water and to rotate in a direction (arrow 203b) which is counter to the direction of rotation during a working stroke. The foremost portion of the cylinder chamber 201 then receives water from the conduit 7 with attendant reduction of pressure in the cylinder 202.

Referring finally to FIG. 4, there is shown an injection molding machine wherein the chamber 301 of the heating cylinder 302 accommodates an axially reciprocable rotary plunger or feed screw 303 having an axial bore 311 whose intake end is connected with the supply conduit 7. The discharge end of the bore 311 faces the nozzle 302a and this bore accommodates a non-return ball valve 312.

It is clear that the improved injection molding machine can be modified in a number of ways without departing from the spirit of our invention. For example, the heating cylinder may be provided with two or more closely adjacent or distant openings each of which is connected to a separate supply conduit. With reference to FIG. 1, the injection molding machine shown therein could utilize the plunger 303 of FIG. 4 so that the cylinder chamber 1 would receive water at two points. Also, the cylinder 2 of FIG. 1 could be provided with a second opening corresponding to the opening 210 of FIG. 3 or to the opening 109 of FIG. 2.

The method and machine of our invention may be utilized in processing of a wide variety of thermosetting synthetic plastic materials, for example, in injection molding of alkyds, amino resins, phenolics and/or others. Whether the conduit 7 should admit water in liquid or vaporized state will depend on the circumstances, particularly on the estimated duration of stoppage. Water in liquid state will be used in most instances because its delaying effect is more pronounced. This is attributed to the fact that, during evaporation, water withdraws a larger quantity of heat energy from the thermosetting material which fills the cylinder chamber.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims.

What is claimed is:

1. In a method of operating an injection molding machine for thermosetting synthetic plastic material comprising a cylinder forming a chamber accommodating a reciprocable plunger, said cylinder having a nozzle provided at one end thereof and communicating at a point spaced from said nozzle with feed means feeding thermosetting material into said chamber, the steps of admitting into said chamber at a point between said feed means and said nozzle only shortly prior to stopping of said machine an amount of water, not exceeding 5% by volume of the thermosetting material present in said chamber, but sufficient to prevent hardening of the thermosetting material in said chamber during said stopping of the machine; stopping said machine and expelling said wetted thermosetting material from said chamber through said nozzle thereof before resuming molding operation following said stopping of the machine so as to discard said wetted thermosetting material.

2. A method as defined in claim 1, wherein water is admitted in liquid state.

3. A method as defined in claim 1, wherein water is admitted in vaporized state.

4. A method for preventing hardening of thermosetting synthetic plastic material in an injection molding machine whose plunger is provided with an expansion chamber as defined in claim 1, wherein water is admitted into such expansion chamber.

5. A method as defined in claim 1, wherein water is admitted into a region of the cylinder chamber which is nearer to the feed chute than to the nozzle of the cylinder.

6. A method as defined in claim 5, wherein water is admitted in immediate proximity of the feed chute.

7. A method as defined in claim 1, wherein water is admitted into a region of the cylinder chamber which is adjacent to the nozzle.

8. A method as defined in claim 7, further comprising the step of retracting the plunger in a direction away from the nozzle simultaneously with admission of water to reduce the pressure in the cylinder chamber.

9. A method of preventing hardening of thermosetting synthetic plastic material in an injection molding machine wherein the plunger is constituted by a feed screw which is rotatable in a first direction and is movable axially toward the nozzle to thereby expel material from the cylinder chamber as defined in claim 8, further comprising the step of rotating the plunger counter to said first direction simultaneously with retraction of the plunger during admission of water into the cylinder chamber.

10. A method as defined in claim 1, wherein water is admitted through the plunger.

11. A method as defined in claim 10, wherein water is admitted through an axial bore of the plunger in a direction toward the nozzle.

References Cited

UNITED STATES PATENTS

| | | | |
|---|---|---|---|
| 2,346,228 | 4/1944 | Merrill et al. | 264—39 |
| 2,346,708 | 4/1944 | Smidth | 264—39 X |
| 2,862,239 | 12/1958 | Pollard et al. | 264—39 |
| 2,980,493 | 4/1961 | McDermott | 264—39 |
| 3,146,287 | 8/1964 | Kleine-Albers | 264—329 |
| 3,193,877 | 7/1965 | Edwards. | |
| 3,233,288 | 2/1966 | Strauss | 264—39 X |
| 3,384,690 | 5/1968 | Lockhart | 264—39 |

FOREIGN PATENTS 830,167  1/1952  Germany.

ROBERT F. WHITE, Primary Examiner

N. RUSHEFSKY, Assistant Examiner

U.S. Cl. X.R.

18—12, 30; 264—329